US012787984B2

(12) United States Patent
Zhang

(10) Patent No.: US 12,787,984 B2
(45) Date of Patent: Nov. 10, 2026

(54) FOLDING HANDRAIL STRUCTURE FOR PET RAMPS

(71) Applicant: SHENZHEN HUIKAIDA TECHNOLOGY CO., LTD, Shenzhen (CN)

(72) Inventor: He Zhang, Guangzhou (CN)

(73) Assignee: SHENZHEN HUIKAIDA TECHNOLOGY CO., LTD, Shenzhen (CN)

( * ) Notice: Subject to any disclaimer, the term of this patent is extended or adjusted under 35 U.S.C. 154(b) by 142 days.

(21) Appl. No.: 19/000,777

(22) Filed: Dec. 24, 2024

(65) Prior Publication Data

US 2026/0157346 A1 Jun. 11, 2026

(30) Foreign Application Priority Data

Dec. 9, 2024 (CN) ......................... 202423025130.9

(51) Int. Cl.

*A01K 29/00* (2006.01)
*A01K 1/00* (2006.01)
*E04F 11/00* (2006.01)
*E04F 11/18* (2006.01)

(52) U.S. Cl.

CPC ............ *A01K 29/00* (2013.01); *A01K 1/0035* (2013.01); *E04F 11/002* (2013.01); *E04F 11/18* (2013.01); *E04F 2011/005* (2013.01); *E04F 2011/007* (2013.01)

(58) Field of Classification Search

CPC .......................... E04F 11/002; E04F 2011/005
See application file for complete search history.

(56) References Cited

U.S. PATENT DOCUMENTS

| | | | | |
|---|---|---|---|---|
| 449,228 | A * | 3/1891 | Myers et al. | A01K 1/035 119/849 |
| 3,912,298 | A * | 10/1975 | Humphrey | B60R 3/02 182/115 |
| 9,376,819 | B2 * | 6/2016 | Suggate | E04B 1/34331 |
| 11,930,790 | B1 * | 3/2024 | Fang | A01K 1/035 |
| D1,124,539 | S * | 4/2026 | Hao | D30/199 |
| D1,124,542 | S * | 4/2026 | Geng | D30/199 |
| 2009/0300860 | A1 * | 12/2009 | Campbell | E04F 11/002 14/72.5 |

FOREIGN PATENT DOCUMENTS

JP 2021055501 A * 4/2021

* cited by examiner

*Primary Examiner* — Robert Canfield
(74) *Attorney, Agent, or Firm* — Nicholas Makridakis

(57) ABSTRACT

This invention provides a folding handrail structure for pet ramps, comprising: a support component, the support component includes a first support plate, hinges, a second support plate, and a storage groove, the hinges are fixedly installed at one end of the bottom of the first support plate, the second support plate is fixedly installed at one end of the bottom of the hinges, the storage grooves are respectively provided on both sides of the first support plate and the second support plate; a regulating component. This invention provides a folding handrail structure for pet ramps, which through the cooperation of the support component, regulating component, and protective component, etc., can open the protective component during pet exercise, allowing the protective component to block the sides of the support component, preventing pets from falling off the sides of the support component, thereby enhancing safety.

7 Claims, 6 Drawing Sheets

FOLDING HANDRAIL STRUCTURE FOR PET RAMPS

TECHNICAL FIELD

The present invention relates to the field of pet supplies technology, and particularly to a folding handrail structure for a pet ramp.

BACKGROUND

Pets are animals raised by people to alleviate loneliness or for entertainment needs among the numerous types of pets cats and dogs are the most numerous having undergone long-term evolutionary changes cats and dogs have gradually moved away from the original biological chain of nature no longer directly participating in maintaining ecological balance but instead perfectly adapting to human family life deeply integrating into peoples daily routines and work scenarios with pet dogs being particularly common.

As society continues to advance and the enthusiasm for pet ownership continues to rise, the market for pet-related products is becoming increasingly vibrant with growing demand. In terms of household scenarios, to ensure that pet dogs get adequate exercise, numerous innovative products have emerged on the market. For example, one such product is a folding slide that uses several parallel sliding boards connected by rotating links. The sides of the sliding boards are equipped with side panels, and the surface of the sliding boards is covered with sandpaper. The bottom surface of the sliding boards features several stepped slots. This invention is applied to pet exercise.

However, the slide lacks protective components, and pet dogs are likely to fall from the side of the slide when climbing, thus reducing the safety.

Therefore, it is necessary to provide a folding handrail structure applied to the pet ramp to solve the above technical problems.

SUMMARY

The invention provides a folding handrail structure for pet ramp, which solves the problem of lack of protective components and reduces safety.

In order to solve the above technical problems, this invention provides a folding handrail structure applied to pet ramp, including a support component, an adjustable component, and protective components.

The support components include a first support plate, hinges, a second support plate, and storage slots. Herein the hinges are arranged between a bottom of one end of the first support plate and a bottom of one end of the second support plate to securely connect the first and the second support plates, and the storage slots are respectively provided on both sides of the first support plate and the second support plate.

The adjustable component is set at a bottom of the support component, and the adjustable component includes a shaft, a support frame, a positioning rod, a positioning frame, and positioning grooves. Herein the shaft is fixedly installed at a bottom of the other end of the first support plate, the support frame is rotably connected to both ends of the shaft, the positioning rod is fixedly installed inside a bottom of the support frame, the positioning frame is rotably connected to a bottom of the one end of the first support plate, the positioning groove is provided on one side of the positioning frame.

The protective components are respectively set on both sides of the first support plate and the second support plate, each of the protective components include a cross rod and two first rotating rods, one end of the two first rotating rods are respectively rotably connected to both ends of the cross rod, and another end of the two first rotating rods are respectively rotably connected to either side of the first support plate or the second support plate.

Preferably, the positioning grooves are provided with multiple, and the positioning rod is set on an inner side of one of the positioning grooves.

Preferably, the other end of the first support plate is provided with a blocking component, which includes a railing and two second rotating rods. One end of the two second rotating rods are respectively pivotally connected to both ends of the railing, and another end of the two second rotating rods are pivotally connected to the other end of the first support plate.

Preferably, the bottom of the support frame is internally fixed with a rotatable rod, and both ends of the rotatable rod are rotably connected with rollers.

Preferably, both sides of the other end of the second support plate that is away from the first support plate are each provided with a plug-in plate, one side of the plug-in plate is fixedly installed with an installation block, and a universal wheel is fixedly installed at a bottom of the installation block.

Preferably, the second support plate is located below the first support plate when the pet ramp is unfolded.

Preferably, a locking screw is pressed against a bottom of the other end of the second support plate to secure the plug-in plate.

Compared with the related technology, the folding handrail structure provided by the invention for application in pet ramp has the following beneficial effects.

This invention provides a folding handrail structure for pet ramps, which, through the cooperation of the support component, the adjustable component, and protective components, can be unfolded when exercising pets, allowing the protective components to block the side of the support component to prevent pets from falling off the side of the support component, thereby enhancing safety.

Figure markings: 1. Support Component, 11. First Support Plate, 12. Hinge, 13. Second Support Plate, 14. Storage Slot, 2. Adjustable Component, 21. Shaft, 22. Support Frame, 23. Positioning Rod, 24. Positioning Frame, 25. Positioning groove, 3. Protective Component, 31. Cross Rod, 32. First rotating Rod, 4. Blocking Component, 41. Railing, 42. Second rotating Rod, 5.

Rotatable Rod, 51. Roller, 6. Plug-in Plate, 61. Installation Block, 62. Universal Wheel, 63. Locking Screw.

DETAILED DESCRIPTION OF THE EMBODIMENTS

The present invention is further described with reference to the drawings and embodiments.

First Embodiment

Figure 1:
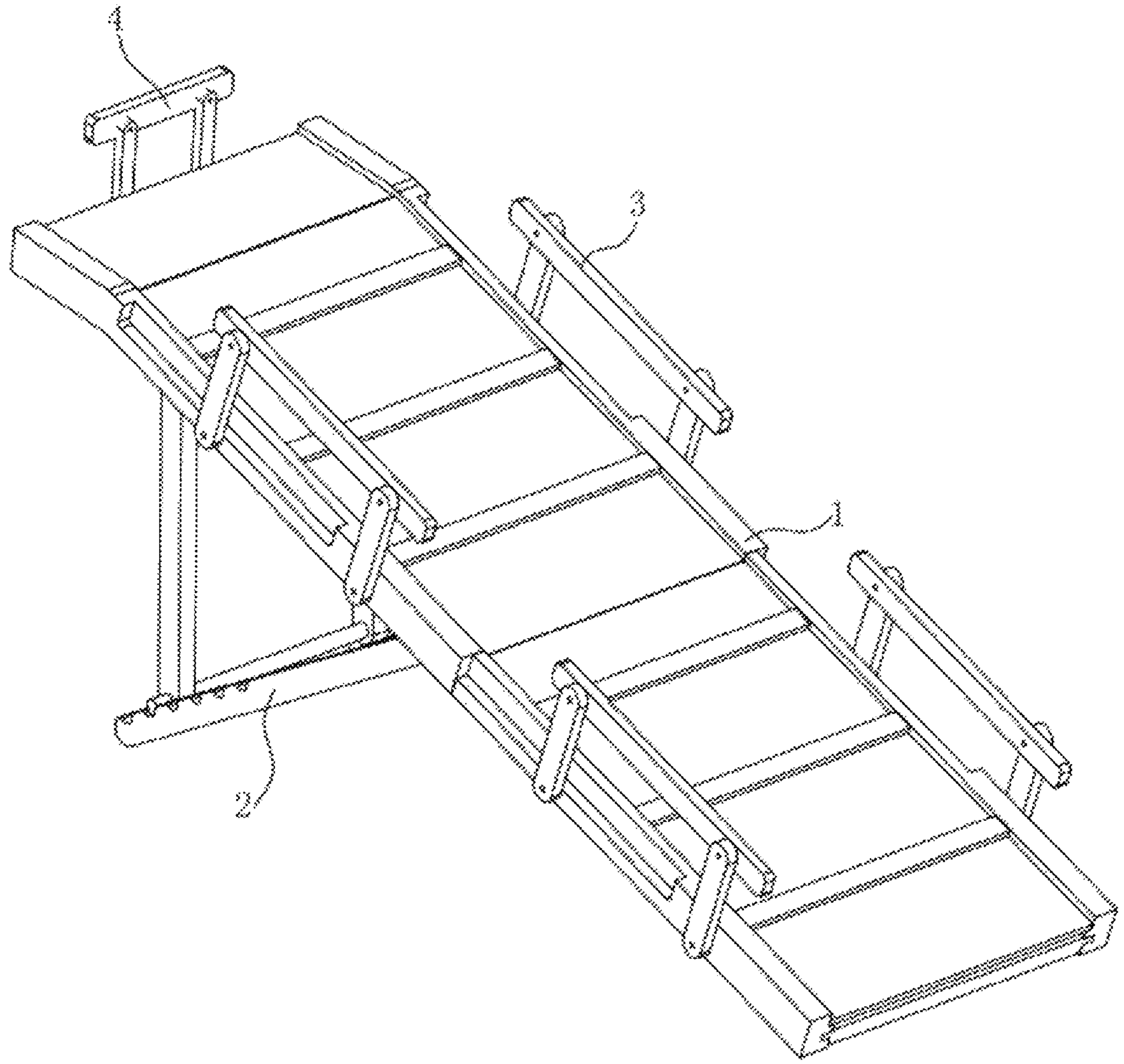
FIG. 1 is a schematic diagram of the first embodiment of a folding handrail structure for a pet ramp provided by the present invention.
Figure 2:
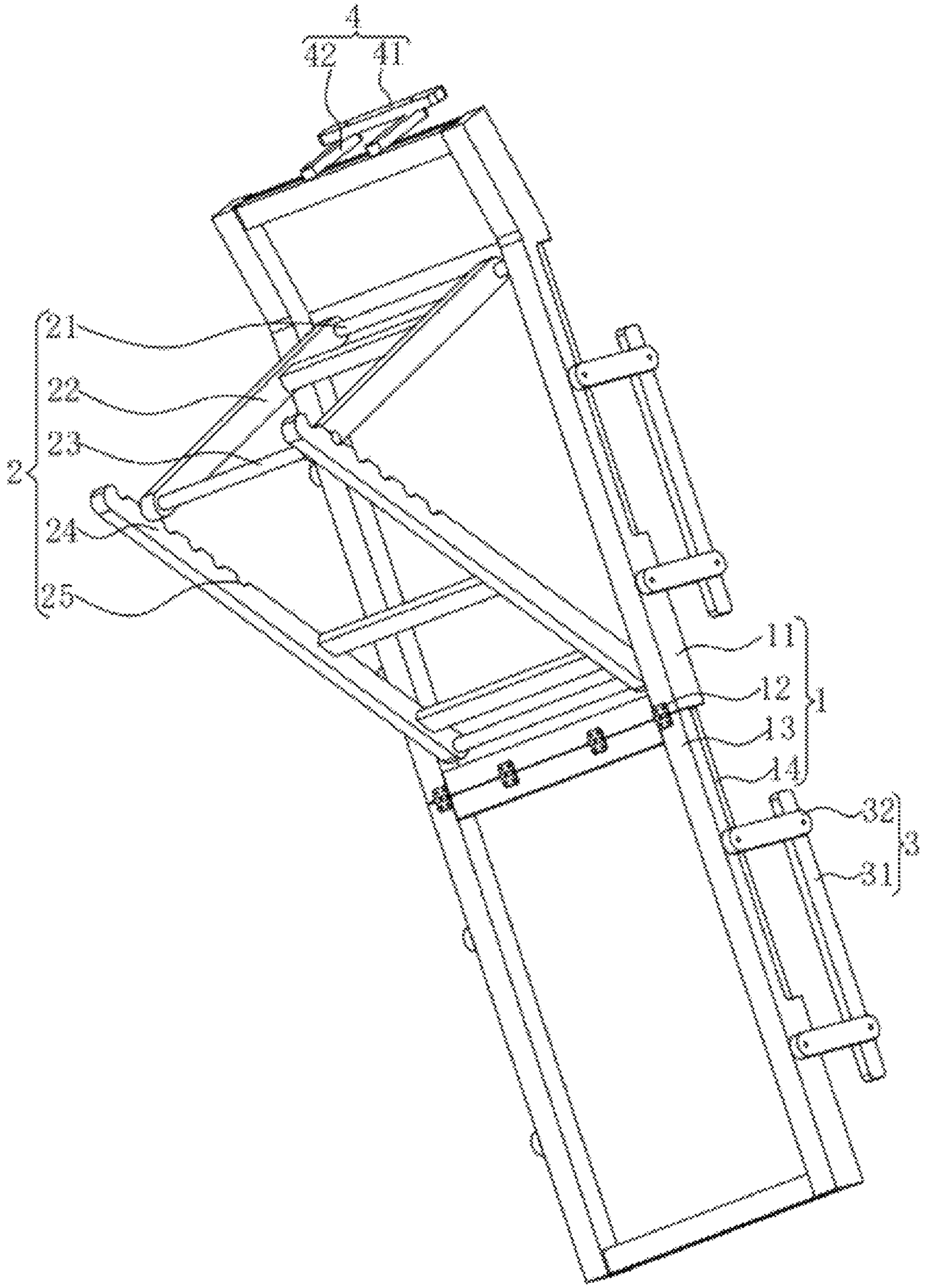
FIG. 2 is another perspective structure diagram of the FIG. 1.
Figure 3:
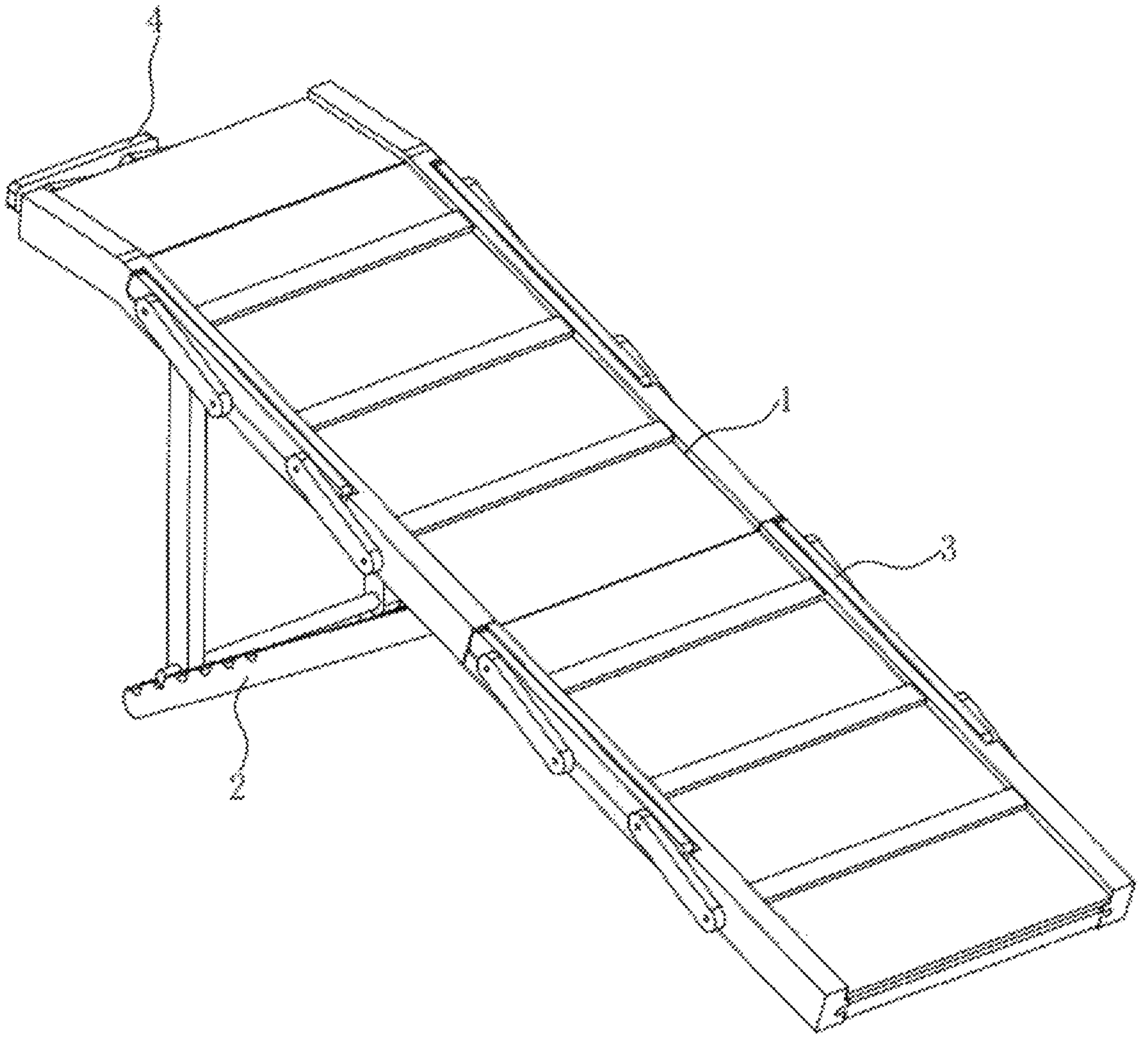
FIG. 3 is a schematic diagram of the folding structure of the railing assembly shown in FIG. 1.
Figure 4:
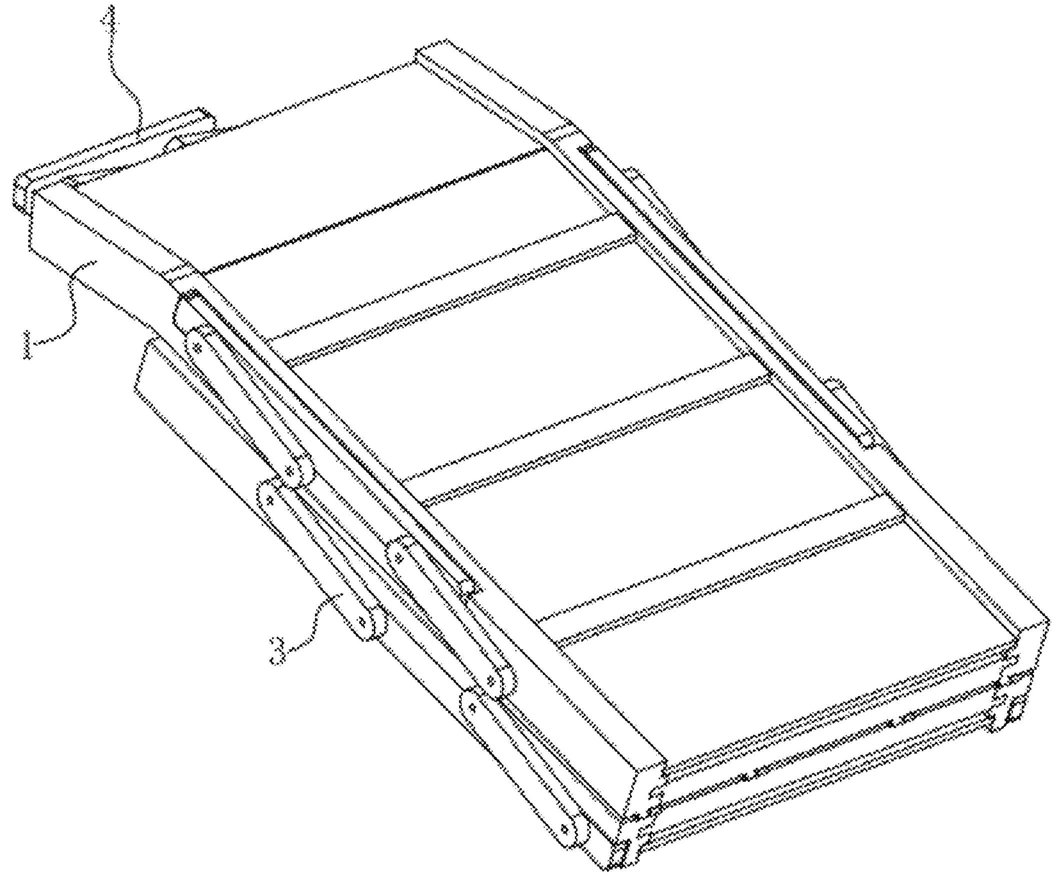
FIG. 4 is a schematic diagram of the overall folded structure shown in FIG. 1.

Please refer to FIGS. 1, 2, 3, and 4, where FIG. 1 is a schematic diagram of the structure of the first embodiment of a folding handrail structure provided by this invention for use in pet ramps; FIG. 2 is another perspective view of the structure shown in FIG. 1; FIG. 3 is a schematic diagram of the folding structure of the handrail assembly shown in FIG. 1; FIG. 4 is a schematic diagram of the overall folded structure shown in FIG. 1.

A folding handrail structure for use in pet ramps comprises: a support component 1, an adjustable component 2, and protection components 3. Herein the support component 1 includes a first support plate 11, hinges 12, a second support plate 13, and storage slots 14, where the hinges 12 are arranged between a bottom of one end of the first support plate 11 and a bottom of one end of the second support plate 13 to securely connect the first and the second support plates, and the storage slots 14 are provided on both sides of the first support plate 11 and the second support plate 13.

Herein the adjustable component 2 is set at a bottom of the support component 1, the adjustable component 2 includes a shaft 21, a support frame 22, a positioning rod 23, a positioning frame 24, and positioning grooves 25. The shaft 21 is fixedly installed at a bottom of the other end of the first support plate 11, the support frame 22 is rotably connected to the outer side of the shaft 21, the positioning rod 23 is fixedly installed inside a bottom of the support frame 22, the positioning frame 24 is rotably connected to the bottom of the one end of the first support plate 11, the positioning grooves 25 are provided on one side of the positioning frame 24.

Herein the protection component 3 is respectively set on both sides of the first support Plate 11 and the second support plate 13, each of the protection component 3 includes a cross rod 31 and two First rotating rods 32, one end of the two First rotating rods 32 are rotably connected to both ends of the cross rod 31, and another end of the two First rotating rods 32 are respectively rotably connected to either side of the first support plate 11 or the second support plate 13.

When the protective component 3 is not required to be used, the protective components 3 can be folded to store all cross rods 31 into the inner side of the storage slots 14, thereby reducing the space occupied.

The first support plate 11 and the second support plate 13 are connected by hinge 12 so that after use, the first support plate 11 and the second support plate 13 can be rotated and folded to reduce the space occupied.

The positioning groove 25 is provided with multiple, and the positioning rod 23 is provided on an inner side of one of the positioning grooves 25.

The positioning rod 23 is inserted into the inner side one of the positioning grooves 25, so that the inclination angle of the support component 1 can be adjusted. In this way, the height at which the pet dog climbs can be adjusted according to the actual situation, so as to adapt to different pet dogs for use, thus increasing the adaptability of the device.

The other end of the first support plate 11 is equipped with a blocking component 4, which includes a railing 41 and two second rotating rods 42. The two second rotating rods 42 are respectively pivotally connected at their ends on one side of the railing 41, and one side at the bottom of the two second rotating rods 42 is pivotally connected to the other end of the first support plate 11.

By setting the blocking component 4, the end of the support component 1 can be blocked to prevent the pet dog from falling from one end of the support component 1, thus increasing the safety.

The working principle of the folding handrail structure for pet ramp provided by the invention is as follows.

After the use, the user can move the four cross rods 31 to the sides of the first support plate 11 and the second support plate 13 respectively, thereby rotating the first rotating rod 32 around the sides of the first support plate 11 and the second support plate 13 as well as the cross rods 31, thus repositioning the cross rods 31 inside the recessed groove 14. Then push the railing 41 to rotate the second rotating rod 42, which allows for the repositioning of the railing 41. Next, move the positioning rod 23 out from the inner side of the positioning groove 25, and subsequently rotate the support frame 22 and the positioning frame 24 to reposition them at the bottom of the first support plate 11. Finally, connect the first support plate 11 and the second support plate 13 via hinges 12, rotating the second support plate 13 to the bottom of the first support plate 11, thereby folding and storing the slide track to reduce space occupation.

Compared with the related technology, the folding handrail structure provided by the invention for application in pet ramp has the following beneficial effects.

By supporting the structure of support component 1, adjustable component 2 and protective component 3 to cooperate with each other, when exercising the pet, the protective component 3 can be opened up to block the side of support component 1, so as to prevent the pet from falling from the side of support component 1, thus increasing the safety.

Second Embodiment

Figure 5:
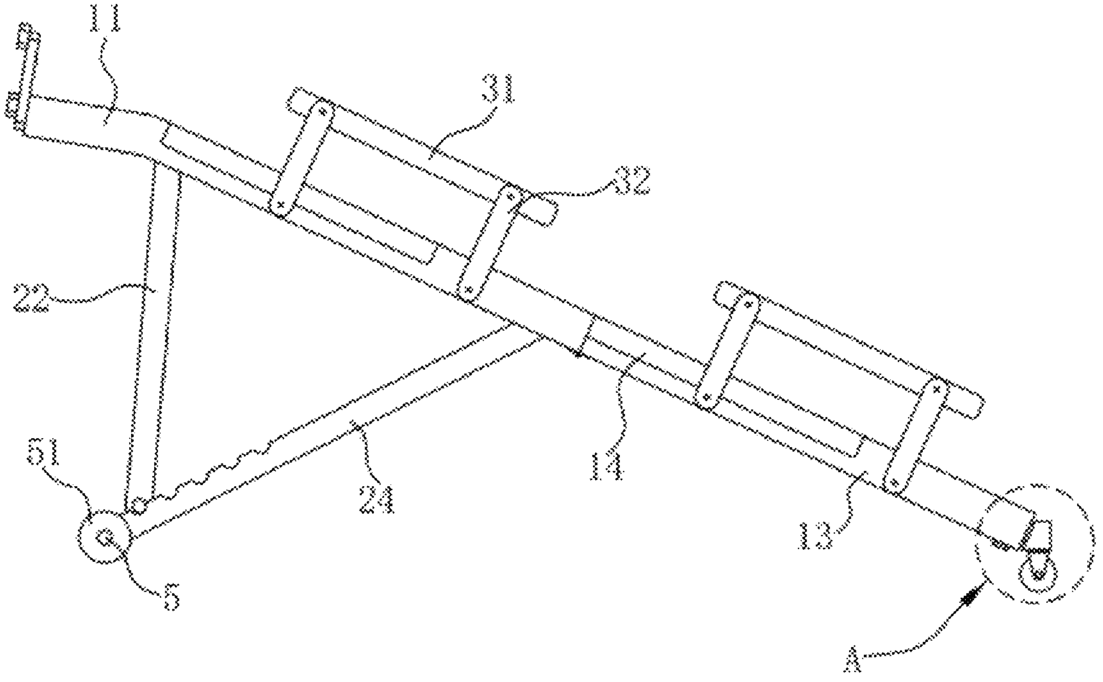
FIG. 5 is a structural diagram of a second embodiment of a folding handrail structure for a pet ramp provided by the invention.
Figure 6:
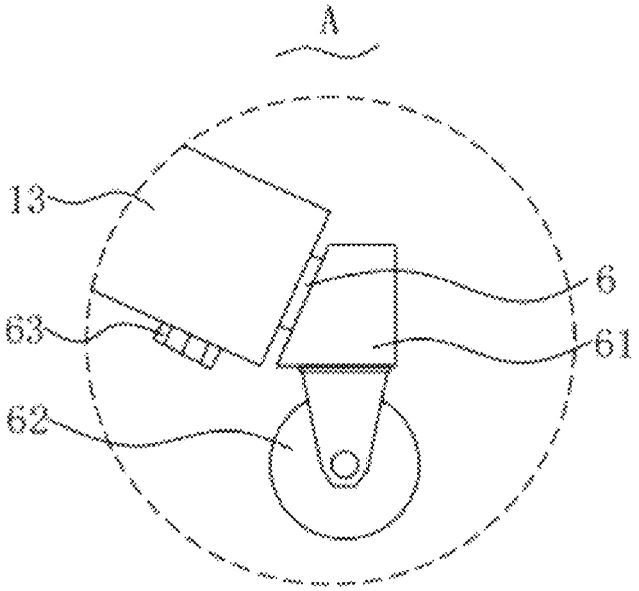
FIG. 6 is an enlarged view of part A shown in FIG. 5.

Please refer to FIG. 5 and FIG. 6, a folding handrail structure for pet ramps is provided based on the first embodiment of this application, while the second embodiment proposes another folding handrail structure for pet ramps. The second embodiment is merely an optional approach to the first embodiment, and the implementation of the second embodiment will not affect the separate implementation of the first embodiment.

Specifically, the second embodiment of this application provides a folding handrail structure for pet ramps that differs in that a folding handrail structure for pet ramps is provided, wherein a rotatable rod 5 is internally fixedly installed at the bottom of the positioning frame 24, and both ends of the rotatable rod 5 are rotably connected to rollers 51.

The other end of the second support plate 13 is provided with a plug plate 6 on both sides, and one end of the plug plate 6 is fixedly installed with an installation block 61, and the bottom of the installation block 61 is fixedly installed with a universal wheel 62.

The other end of the bottom of the second support plate 13 is fixedly installed on both sides with locking screws 63.

One end of the locking screw 63 is pressed against the bottom of the plug plate 6.

The roller 51 and the universal wheel 62 are cooperated with each other, so that it is convenient for the user to adjust the direction of the track when pushing the track, and the universal wheel 62 has a self-locking structure, which can play a limiting role.

The working principle of the folding handrail structure for pet ramp provided by the invention is as follows.

When in use, the plug-in plate 6 can be inserted into the interior of the second support plate 13, then the locking screw 63 can be turned to ensure that one end of the locking screw 63 contacts the bottom of the plug-in plate 6, thereby limiting the movement of the plug-in plate 6. This allows for the installation of the universal wheel 62, enabling subsequent use where the roller 51 and the universal wheel 62 can roll over the ground, facilitating the users adjustment of the devices track position.

Compared with the related technology, the folding handrail structure provided by this invention for pet ramp has the following beneficial effects.

By rotating the rod 5, roller 51, plug-in plate 6, mounting block 61, universal wheel 62, and locking screw 63, etc., they cooperate with each other to enable the roller 51 and universal wheel 62 to roll on the ground during use, thus facilitating the users movement of the devices position, thereby increasing the mobility of the device.

The above-described is merely an embodiment of the invention and does not therefore limit the scope of the patent rights of the invention. Any equivalent structural or equivalent process transformations made by utilizing the contents of the specification and drawings of the invention, or directly or indirectly applied in other related technical fields, are equally included within the scope of the patent protection of the invention.

What is claimed is:

1. A folding handrail structure for a pet ramp, comprising:

a support component, comprising a first support plate, hinges, a second support plate, and storage slots; wherein the hinges are arranged between a bottom of one end of the first support plate and a bottom of one end of the second support plate to securely connect the first and the second support plates, the storage slots are respectively provided on both sides of the first support plate and the second support plate;

an adjustable component, disposed at a bottom of the support component, wherein the adjustable component comprises a shaft, a support frame, a positioning rod, a positioning frame, and positioning grooves; the shaft is fixedly installed at a bottom of another end of the first support plate, the support frame is pivotally connected to both ends of the shaft, the positioning rod is fixedly installed inside a bottom of the support frame, the positioning frame is pivotally connected to the bottom of the one end of the first support plate, the positioning grooves are provided on one side of the positioning frame; and protective components, respectively arranged on both sides of the first support plate and the second support plate, wherein each of the protective components comprises a cross rod and two first rotating rods, one end of the two first rotating rods are respectively rotably connected to both ends of the cross rod, and another end of the two first rotating rods are respectively rotably connected to either side of the first support plate or the second support plate.

2. The folding handrail structure for the pet ramp according to claim 1, wherein the positioning grooves are provided with multiple, and the positioning rod is located on an inner side of one of the positioning grooves.

3. The folding handrail structure for the pet ramp according to claim 1, wherein the another end of the first support plate is provided with a blocking component, the blocking component comprises a railing and two second rotating rods, one end of the two second rotating rods are respectively pivotally connected to both ends of the railing, and another end of the two second rotating rods are pivotally connected to the another end of the first support plate.

4. The folding handrail structure for the pet ramp according to claim 1, wherein the bottom of the support frame is fixedly installed with a rotatable rod, and both ends of the rotatable rod are rotably connected with rollers.

5. The folding handrail structure for the pet ramp according to claim 1, wherein both sides of another end of the second support plate that is away from the first support plate are each provided with a plug-in plate, one side of the plug-in plate is fixedly installed with an installation block, and a bottom of the installation block is fixedly installed with a universal wheel.

6. The folding handrail structure for the pet ramp according to claim 5, wherein the second support plate is located below the first support plate when the pet ramp is unfolded.

7. The folding handrail structure for the pet ramp according to claim 6, wherein a locking screw is pressed against a bottom of the another end of the second support plate to secure the plug-in plate.

* * * * *